United States Patent Office
3,223,341
Patented Dec. 14, 1965

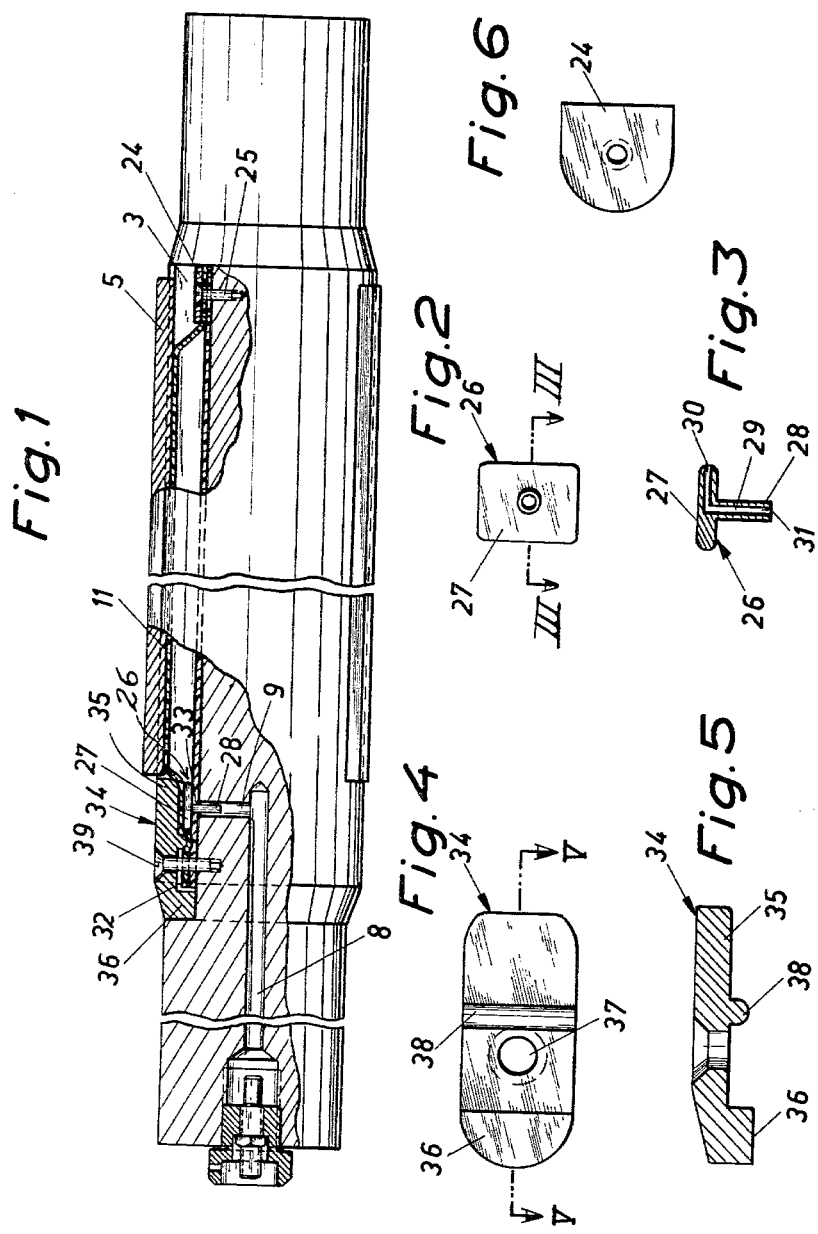

3,223,341
EXPANSIBLE MANDREL
Tore Lennart Gadde, Amal, Sweden, assignor to AB Amals Gjuteri Och Mekaniska Verkstad, Amal, Sweden, a corporation of Sweden
Filed Feb. 14, 1964, Ser. No. 344,900
Claims priority, application Sweden, Oct. 30, 1963, 11,945/63
5 Claims. (Cl. 242—72)

In my patent application Serial No. 319,028, filed October 25, 1963, there is described an improvement in expansible mandrels, particularly drive spindles for gripping winding sleeves for paper rolls etc. which expansible mandrels or drive spindles are provided with expanding means comprising tubular inflatable members or hoses arranged in each their notch and adapted, when blown up, to move a pressing element in the notch radially outwards in such a way that its radially outer border, serving as a gripping border, will extend outside the periphery of the spindle.

The present invention is related to a device for obtaining a good tightening so as to prevent a leakage of inflating fluid, such as compressed air, from said hoses. This object and other ones are obtained by a nipple comprising a head and a tube piece through which there extends a channel debouching with one end at the periphery of said head and with the other end debouching at the free end of the tube piece, the device further comprising a means for clamping one wall of the flattened hose against one side of the head of the nipple and the opposite side surface of the nipple head against the opposite wall of the hose, said tube piece extending through an opening in last mentioned hose wall in such a way that the interior of the hose may be connected to a source of fluid, preferably compressed air, to inflate the hose.

The clamping means may preferably comprise a clamping shoe adapted to be attached to the spindle or mandrel body by means of a screw or the like and thereby to press the two walls of the hose tightening against the nipple head and the ported wall of the hose against the bottom of the notch in question of the spindle.

The invention will now be elucidated with reference had to the accompanying drawing. In the drawing:

FIG. 1 is a partly longitudinally cut side elevation of a drive spindle provided with a device according to the invention, FIG. 2 shows a nipple in view from below to be used at the spindle in FIG. 1.

FIG. 3 shows the same nipple in a section on the line III—III in FIG. 2,

FIG. 4 is a view from below of the clamping shoe for clamping the hose end,

FIG. 5 shows a section corresponding to the section in FIG. 4 on the line V—V, and FIG. 6 shows a clamping plate for the end of the hose opposite the end to be clamped by the clamping shoe according to FIGS. 4 and 5.

As in my above mentioned patent application Serial No. 319,028 the drive spindle 1 is in longitudinal notches 3 provided with rails 5 extending in the logitudinal direction. In the notches 3 there are, inside the rails 5, arranged rubber hoses 11 which, when blown up, press the rails 5 radially outwards. At one end the hose is tightened and pressed against the bottom of the notch 3 by means of a plate 24 (FIG. 6), said plate pressing the hose end against the bottom of the notch 3 by means of a screw 25.

At the opposite end 32 of the hose 11, a nipple 26 is inserted in the hose, said nipple 26 comprising a head 27 and a tube piece 28. The nipple 26 is shown in detail in FIGS. 2 and 3. A channel 29 extends through the nipple 26, said channel 29 with one end 30 debouching at the periphery of the head 27 and with the other end 31 debouching at the free end of the tube piece 28. The nipple 26 extends with the tube piece 28 through an aperture 33 in the hose wall resting against the bottom of the notch 3 and further down into a connection channel 9 which through a bore 8 is connected to a source of compressed air (not shown). The hose end 32 is flattened by means of a clamping shoe shown in detail in FIGS. 4 and 5. The clamping shoe 34 comprises a pressing plate 35 at one end and has at the other end a support heel 36. Further, the clamping shoe 34 has a threaded opening 37 and there is on the underside between the bore 37 and the pressing plate 35 arranged a transverse rib 38.

A screw 39 extending through the opening 37 is used for attaching the clamping shoe 34 to the spindle 1 with the support heel 36 resting against the bottom of said notch, whereas at the tightening of the screw 39 the pressing plate 35 presses the outer wall of the flattened hose end 32 against the outside of the head 27 of the nipple 26 and the head 27 against the inner hose wall, the latter being pressed against the bottom in the notch 3. It is hereby obtained such a tightening that air cannot leak out of the hose at the air admission place. Further, the rib 38 will at the tightening of the screw 39 flatten the hose end 32 outside the nipple 26 in such a way that a sufficient tightening is obtained also at this end.

The invention is not limited to the shown and described embodiments but many modifications may be carried out within the scope of the appended claims. Thus, the nipple 26 as well as the clamping shoe 34 may be manufactured from different kinds of metals and metal alloys but also hard plastics may be used.

What I claim is:

1. An expansible mandrel comprising an elongated body, a notch in said body, expanding means comprising a tubular, inflatable member in said notch, said member being adapted to be inflated to extend laterally beyond the periphery of said body and thereby to expand the mandrel, a conduit opening at one end at the outside of said body and at the other end at said notch and adapted at its opening outside said body to communicate with a source of a fluid to inflate said inflatable member, an aperture in the wall of said inflatable member located toward an end of said inflatable member, said aperture being in registry with the conduit opening at the notch, a nipple comprising a head and a tube piece, said nipple head being positioned in said inflatable member adjacent said aperture and said tube piece extending through said aperture and into said conduit, a channel through said nipple and opening at one end at said nipple head inside said inflatable member and at the other end at said tube piece inside said conduit, a pressing element in juxtaposition to the apertured end of said inflatable member at the outside of the wall of said inflatable member opposite the apertured wall, means to urge the pressing element against said inflatable member whereby the walls of the said inflatable member are pressed together and against the nipple head and the apertured wall of the inflatable member is pressed against the bottom of the notch.

2. The expansible mandrel of claim 1, wherein said inflatable member is a hose, said pressing means comprises a clamping shoe and said urging means comprises a screw in combination with a threaded hole adapted to accommodate the screw and extending through the clamping shoe and the hose walls and into the mandrel.

3. The expansible mandrel of claim 2, wherein said clamping shoe is provided with a transverse rib adapted to flatten, outside the nipple, the hose against the bottom of the notch.

4. The expansible mandrel of claim 3, wherein said clamping shoe is provided with a clamping plate which is adapted, at the tightening of the screw, to press the hose walls against the nipple head and the apertured wall of the hose against the bottom of the notch.

5. The expansible mandrel of claim 4, wherein said clamping shoe is oblong in shape and, at one end, provided with a support heel, said support heel being adapted to rest against the bottom of the notch, and said hole extends through the clamping shoe at a place located between said support heel and said rib.

References Cited by the Examiner
UNITED STATES PATENTS

| | | | |
|---|---|---|---|
| 2,711,863 | 6/1955 | Grettve | 242—72 |
| 2,971,765 | 2/1961 | Atherholt | 242—72 |

FOREIGN PATENTS

| | | |
|---|---|---|
| 1,254,383 | 1/1961 | France. |

MERVIN STEIN, *Primary Examiner.*

N. L. MINTZ, *Assistant Examiner.*